(12) United States Patent
Choi et al.

(10) Patent No.: US 8,619,168 B2
(45) Date of Patent: Dec. 31, 2013

(54) IMAGE SENSOR WITH HIGH DYNAMIC RANGE IMAGING AND INTEGRATED MOTION DETECTION

(75) Inventors: Jaehyuk Choi, Ann Arbor, MI (US); Euisik Yoon, Superior Township, MI (US)

(73) Assignee: Regents of the University of Minnesota, St. Paul, MN (US)

( * ) Notice: Subject to any disclaimer, the term of this patent is extended or adjusted under 35 U.S.C. 154(b) by 675 days.

(21) Appl. No.: 12/678,707

(22) PCT Filed: Sep. 26, 2008

(86) PCT No.: PCT/US2008/077927
§ 371 (c)(1),
(2), (4) Date: Jun. 23, 2010

(87) PCT Pub. No.: WO2009/042901
PCT Pub. Date: Apr. 2, 2009

(65) Prior Publication Data
US 2010/0277607 A1    Nov. 4, 2010

Related U.S. Application Data

(60) Provisional application No. 60/976,274, filed on Sep. 28, 2007.

(51) Int. Cl.
*H04N 3/14*    (2006.01)
*H04N 5/335*    (2011.01)

(52) U.S. Cl.
USPC ........... 348/294; 348/298; 348/302; 348/308; 348/312

(58) Field of Classification Search
USPC ......................... 348/294, 298, 302, 308, 312; 250/208.1; 257/290–292
See application file for complete search history.

(56) References Cited

U.S. PATENT DOCUMENTS

| | | | |
|---|---|---|---|
| 5,949,483 A | 9/1999 | Fossum et al. | |
| 6,057,539 A | 5/2000 | Zhou et al. | |
| 6,118,482 A | 9/2000 | Clark et al. | |
| 6,977,685 B1 | 12/2005 | Acosta-Serafini et al. | |
| 7,075,049 B2 | 7/2006 | Rhodes et al. | |
| 7,630,008 B2 | 12/2009 | Sarwari | |
| 7,964,929 B2 | 6/2011 | Fan | |
| 2003/0210334 A1 | 11/2003 | Sarwari | |
| 2005/0057675 A1 | 3/2005 | Lee et al. | |
| 2005/0110093 A1 | 5/2005 | Altice, Jr. et al. | |
| 2006/0192876 A1 | 8/2006 | Sarwari | |
| 2007/0084986 A1* | 4/2007 | Yang et al. ................ | 250/208.1 |
| 2008/0074523 A1* | 3/2008 | Panicacci ..................... | 348/308 |
| 2009/0053848 A1 | 2/2009 | Fan | |
| 2010/0026838 A1* | 2/2010 | Belenky et al. ........... | 348/229.1 |

OTHER PUBLICATIONS

U.S. Appl. No. 11/851,957, "Spatial-Temporal Multi-Resolution Image Sensor with Adaptive Frame Rates for Tracking Movement in a Region of Interest," filed Sep. 7, 2007.

(Continued)

*Primary Examiner* — Yogesh Aggarwal
(74) *Attorney, Agent, or Firm* — Shumaker & Sieffert, P.A.

(57) ABSTRACT

This disclosure describes: (1) two different schemes to enhance dynamic range, (2) a new motion detection scheme using in-pixel digital storage, and (3) the motion detection in high illumination for CMOS image sensors. The schemes may be implemented in a small pixel size and easily incorporated in simple column-level circuits for existing CMOS image sensor systems.

20 Claims, 12 Drawing Sheets

(56) References Cited

OTHER PUBLICATIONS

U.S. Appl. No. 60/976,274, "Image Sensor with High Dynamic Range Imaging and Integrated Motion Detection," filed Sep. 28, 2007.

Choi et al., "A Spatial-Temporal Multiresolution CMOS Image Sensor With Adaptive Frame Rates for Tracking the Moving Objects in Region-of-Interest and Suppressing Motion Blur," IEEE Journal of Solid-State Circuits, vol. 42, No. 12, pp. 2978-2989, Dec. 2007.

Han et al., "A High Dynamic Range CMOS Image Sensor with In-Pixel Floating-Node Analog Memory for Pixel Level Integration Time Control," VLSI Circuits, 2 pages, 2006.

International Preliminary Report on Patentability from corresponding PCT Application PCT/US2008/077927, mailed Apr. 8, 2010.

S. Lauxtermann et al., "A High-Speed CMOS Imager Acquiring 5000 Frames/Sec," IEDM Technical Digest, pp. 36.3.1-36.3.4, Dec. 5-8, 1999.

A.I. Krymski et al., "A High-Speed, 240-Frames/s, 4.1 Mpixel CMOS Sensor," IEEE Transactions on Electron Devices, vol. 50, No. 1, pp. 130-135, Jan. 2003.

A.I. Krymski et al., "A 9-V/Lux-s 5000-Frames/s 512×512 CMOS Sensor," IEEE Transactions on Electron Devices, vol. 50, No. 1, pp. 136-143, Jan. 2003.

S. Kleinfelder et al., "A 10000 Frames/s CMOS Digital Pixel Sensor," IEEE Journal of Solid-State Circuits, vol. 36, No. 12, pp. 2049-2059, Dec. 2001.

S.Y. Ma et al., "A Single-Chip CMOS APS Camera with Direct Frame Difference Output," IEEE Journal of Solid-State Circuits, vol. 34, No. 10, pp. 1415-1418, Oct. 1999.

U. Mallik et al., "Temporal Change Threshold Detection Imager," 2005 IEEE International Solid-State Circuits Conference, Digest of Technical Papers, pp. 362-363, Feb. 2005.

O. Schrey et al., "A 1K×1K High Dynamic Range CMOS Image Sensor With On-Chip Programmable Region-of-Interest Readout," IEEE Journal of Solid-State Circuits, vol. 39, No. 7, pp. 911-915, Jul. 2002.

Y. Sugiyama et al., "A High-Speed, Profile Data Acquiring Image Sensor," 2005 IEEE International Solid-State Circuits Conference, Digest of Technical Papers, pp. 360-361, Feb. 2005.

Z. Zhou et al., "A CMOS Imager with On-Chip Variable Resolution for Light-Adaptive Imaging," ISSCC Digest of Technical Papers, pp. 174-175, Feb. 1998.

S.E. Kemeny et al., "Multiresolution Image Sensor," IEEE Transactions on Circuits and Systems for Video Technology, vol. 7, No. 2, pp. 575-583, Aug. 1997.

S. Lauxtermann et al., "A Megapixel CMOS Imager with Charge Binning," Proc. SPIE, vol. 4306, pp. 85-92, May 2001.

E. Artyomov et al., "Morton (Z) Scan Based Real-Time Variable Resolution CMOS Image Sensor," IEEE Transactions on Circuits and Systems for Video Technology, vol. 15, No. 7, pp. 947-952, Jul. 2005.

K.H. Lee, "A CMOS Active Pixel Sensor with Controlled Reset and Spatial-Temporal Multi-Resolution Readout," Ph.D. Dissertation, Dept. Eng., KAIST, Daejeon, Korea, 99 pages, 2004.

K.H. Lee, "A CMOS Image Sensor with Reset Level Control Using Dynamic Reset Current Source for Noise Suppression," 2004 IEEE International Solid-State Circuits Conference, 2004 Digest of Technical Papers, 10 pages, Feb. 15-19, 2004.

M. Mori et al., "¼-Inch 2-Mpixel MOS Image Sensor With 1.75 Transistors/Pixel," IEEE Journal of Solid-State Circuits, vol. 39, No. 12, pp. 2426-2430, Dec. 2004.

D. Senderowicz et al., "Low-Voltage Double Sampled Converters," IEEE Journal of Solid-State Circuits, vol. 32, No. 12, pp. 1907-1919, Dec. 1997.

B. Pain et al., "Dynamically Reconfigurable Vision with High Performance CMOS Active Pixel Sensors (APS)," IEEE Sensors Conference, pp. 1-6, Jun. 10-12, 2002.

\* cited by examiner

IMAGE SENSOR WITH HIGH DYNAMIC RANGE IMAGING AND INTEGRATED MOTION DETECTION

This application claims priority from U.S. Provisional Application Ser. No. 60/976,274 filed Sep. 28, 2007, the entire content of which is incorporated herein by reference.

TECHNICAL FIELD

This disclosure relates generally to image and video processing, and more particularly, to image sensors.

BACKGROUND

Dynamic range is one of the most important parameter in complementary metal-oxide-semiconductor (CMOS) image sensors. For example, dynamic range of natural scenes that we see in daily life is over 120 dB. Unfortunately conventional solid-state image sensors only cover 60~70 dB at most without any special techniques. Conventional approaches to achieve high dynamic range (HDR) (i.e., a dynamic range above 70 dB) typically result in significant sacrifice with respect to pixel size, fill factor, and power consumption. This may limit the application of CMOS image sensors for portable devices or wireless sensor networks in which the chip area, bandwidth, and power consumptions are restricted.

Many applications require capturing an image of fast moving objects without distortion. Example applications are surveillance systems, traffic cameras, robotic visions, destruction testing, and scientific experiments. In some applications like automotive or outdoor surveillance systems, motion detection function is also important for controlling the vehicle or entire camera systems.

The motion detection function can be integrated in the imager and the motion information can be provided at extremely high speed. However, when the illumination is high (i.e., in the HDR domain), motion detection is unavailable with the conventional motion detection schemes. This is because the pixel is saturated in high illumination; therefore, both the HDR imaging scheme and the motion detection scheme cannot be integrated simultaneously in the single chip.

SUMMARY

This disclosure describes: (1) two different schemes to enhance dynamic range, (2) a new motion detection scheme using in-pixel digital storage, and (3) the motion detection in high illumination for CMOS image sensors. As disclosed in detail below, the techniques may be implemented in a small pixel size and easily incorporated in simple column-level circuits for existing CMOS image sensor systems.

One technique described herein enhances dynamic range by controlling the integration time of each pixel. The appropriate integration time may be determined from the illumination level and stored in memory. For example, pixels with high illumination may have shorter integration time to avoid saturation, while pixels with low illumination may have longer integration time since saturation may not be an issue. To avoid saturation, during integration, stored reset information may be used to check whether reset should be performed or not so as to restart pixel integration and avoid saturation. The reset information is then stored as in-pixel digital data for use in calculation of an actual illumination for the pixel. That is, given a triggering of a conditional reset during an integration period, an illumination for a pixel can be computed given the illumination collected after the conditional reset during the remaining period of the integration period as well as the reset information that provides an indicator of when the conditional reset was triggered. As one example, to achieve more than 120 dB of dynamic range, reset information of at least 10 levels (i.e., 10 different sampling points during the integration period) with 4 bit (4-b) resolution may be used. Allocating 4-b per pixel for in-pixel storage of reset information increases the frame memory size. In accordance with one example embodiment, instead of allocating 4-b reset information per-pixel, 4-b reset information may be provided by four neighboring pixels, where each pixel stores 1-b in the floating diffusion node within a pixel.

Motion detection may also be performed by using the in-pixel digital storage. The signal difference between the current frame and the previous frame may indicate motion. The previous frame signal may be stored in the floating diffusion node. In this manner, motion detection may be achieved without additional circuitry. By coupling the motion detection using in-pixel digital storage and the digital reset information, motion detection may be achieved even in high illumination.

Another technique described herein enhances dynamic range by using dual photodiodes per pixel. One of the photodiodes, the primary photodiode, may acquire image signals and the other photodiode, secondary photodiode, may acquire reset information. Signals from the secondary photodiode may be quantized, for example, to 4-b signals. Based on the quantized 4-b signal, the primary photodiode may be conditionally reset.

In one embodiment, the invention is directed to an image sensor comprising, an array of pixels to capture an image, the array of pixels arranged as a plurality of pixel groups, each of the pixel groups having a two or more pixels, each having a floating diffusion node for outputting an image signal, and control logic to store digital reset information within the floating diffusion nodes of each pixel group, wherein the digital reset information for each pixel group indicates a point in time when one or more of the pixels of the pixel group was reset during an integration period.

In another embodiment, the invention is directed to an image sensor comprising, an array of pixels to capture an image, the array of pixels arranged as a plurality of pixel groups, each of the pixel groups having a two or more pixels, each having a shared floating diffusion node for outputting an image signal, wherein each pixel comprises a first photodiode with a high dynamic range and a second photodiode with a sensitivity lower than the sensitivity of the first diode, and control logic to trigger a conditional reset during an integration period for the pixel group to reset collection of illumination of the first photodiode when illumination of the second photodiode reaches a specified threshold.

In another embodiment, the invention is directed to a method comprising, storing digital reset information within a group of pixels within an image sensor, wherein the digital reset information for each pixel group indicates a point in time when one or more of the pixels of the pixel group was reset during an integration period, wherein each of the pixels stores one bit of the digital reset information in a floating diffusion node, and outputting illumination values for the pixels computed from image signals read from the pixels and the digital reset information.

In another embodiment, the invention is directed to a method comprising, loading into a latch a stored reset information, reading out an image signal, performing analog-to-digital conversion of an image signal, changing a row address for conditional reset, comparing the stored reset information with an external reference signal, resetting if the stored reset information and the external reference signal are equal, generating a new reset information based on the analog-to-digital conversion of the image signal, and updating a floating diffusion node with the new reset information.

In another embodiment, the invention is directed to a method comprising, quantizing an image signal, storing the quantized image signal in floating diffusion nodes, loading a stored previous frame signal into a latch, reading the current frame signal, converting the current frame signal from an analog signal to a digital signal, and comparing the latched stored previous frame signal with the digital signal.

In another embodiment, the invention is directed to a method comprising storing digital reset information within a group of pixels within an image sensor, wherein the digital reset information for each pixel group indicated a point in time when one or more pixels of the pixel group was reset during an integration period, wherein each of the pixels stores one bit of the digital reset information in a floating diffusion node, capturing an image with the image sensor, detecting motion within a region of interest of the image by comparing the digital reset information computed for a current frame with the stored digital reset information, and outputting a motion image based on the detected region of interest.

In another embodiment, the invention is direct to a video capture device comprising an image sensor. The image sensor comprises an array of pixels to capture an image, the array of pixels arranged as a plurality of pixel groups, each of the pixel groups having a two or more pixels, each having a floating diffusion node for outputting an image signal, and control logic to store digital reset information within the floating diffusion nodes of each pixel group, wherein the digital reset information for each pixel group indicates a point in time when one or more of the pixels of the pixel group was reset during an integration period. The video capture device further comprises a motion detection unit that identifies a region of interest by comparing the digital reset information computed for a current frame with the stored digital reset information and provides an address for the region of interest to the image sensor. The video capture device also comprises a signal processing unit that receives a motion signal based on the region of interest and an image signal based on the captured image from the image sensor and generates a merged output signal based on the motion signal and image signal, and a display unit that receives the merged output signal and displays the merged output signal to a user.

In another embodiment, the invention is directed to an image sensing device. The image sensing device comprises means for storing digital reset information within a group of pixels within an image sensor, wherein the digital reset information for each pixel group indicates a point in time when one or more of the pixels of the pixel group was reset during an integration period, wherein each of the pixels stores one bit of the digital reset information in a floating diffusion node, and means for outputting illumination values for the pixels computed from image signals read from the pixels and the digital reset information.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
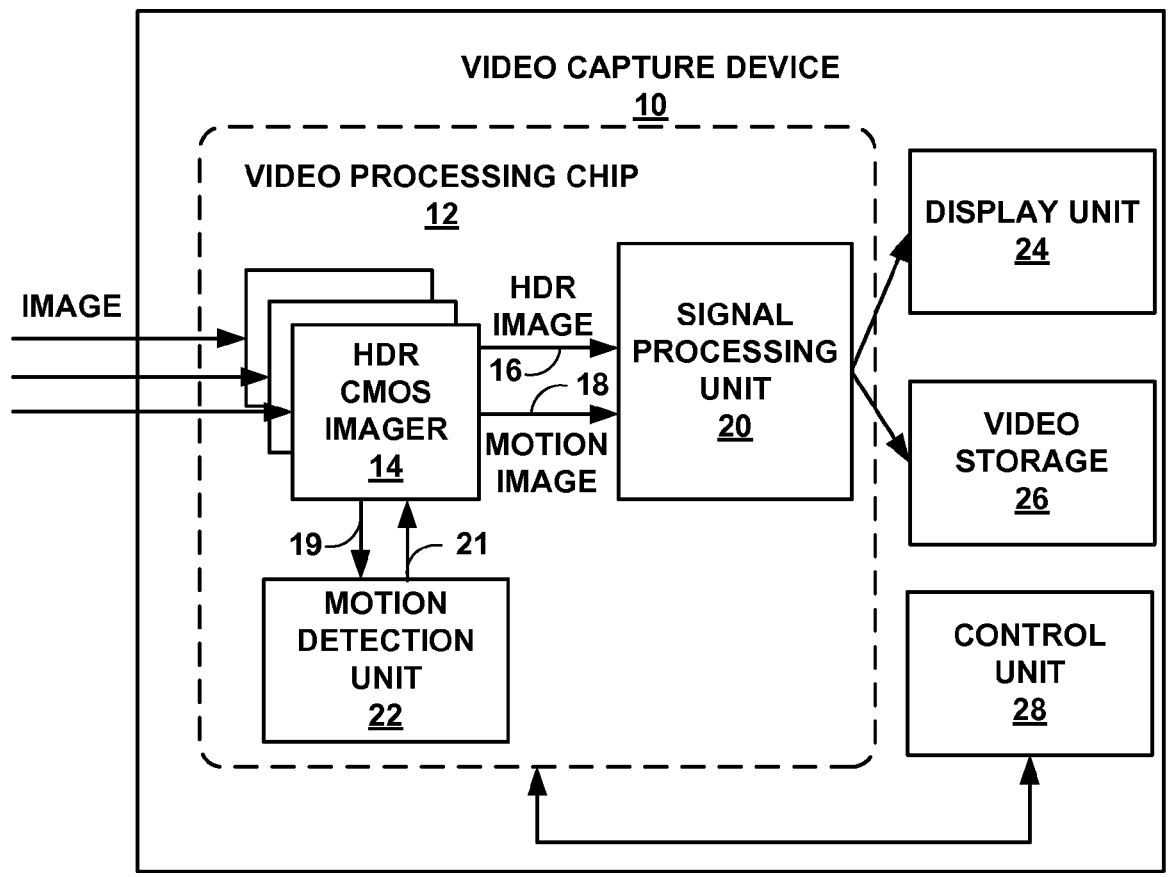
FIG. 1 is a block diagram illustrating an example video capture device for capturing and processing image data in accordance with the principles of the invention.

FIG. 1 is a block diagram illustrating an example video capture device 10 for capturing and processing image data in accordance with the principles of the invention. By way of example, video capture device 10 may comprise a digital video camera, a video-enabled wireless communication device such as a cellular or satellite radio telephone, a video-enabled personal digital assistant (PDA), or any device with imaging or video capabilities.

As shown in FIG. 1, video capture device 10 includes a video processing chip 12 to capture raw image data and perform various processing techniques on such data. Video processing chip 12 includes one or more high dynamic range (HDR) complementary metal-oxide-semiconductor (CMOS) image sensors 14 that capture pixelized image data. Motion detection unit 22 identifies a region-of-interest (ROI) within a frame based on motion image signals 19 received from CMOS image sensor(s) 14, and provides address information 21 for the ROI within the frame to CMOS image sensor(s) 14. Motion detection unit 22 may recalculate the location of the ROI on a frame-by-frame basis. One example of CMOS image sensor having an integrated motion detection within the ROI of an image frame is disclosed in U.S. application Ser. No. 11/851,957, entitled "Spatial-Temporal Multi-Resolution Image Sensor with Adaptive Frame Rates for Tracking Movement in a Region of Interest" filed on Sep. 7, 2007, the contents of which are incorporated herein by reference.

As described in further detail below, HDR image sensor(s) 14 output image data via a HDR image signal 16 and a motion image signal 18 to signal processing unit 20. HDR image signal 16 may include the portions of the high dynamic range image. HDR image signal 16 may have a higher dynamic range, whereas motion image signal 18 may contain change in motion information. Without saturation, the HDR imager (>120 dB or >20-b) provides image signal to signal processing unit 20. At the same time, HDR image sensor(s) 14 detects the motion with high speed and it delivers the motion image signal 18 to signal processor 20. Signal processing unit 20 may output a merged video output to display unit 24 and/or video storage 26. In some embodiments, signal processing unit 20 may be integrated on-chip with CMOS image sensors 14. Further, in some embodiments, HDR image sensor(s) 14 may identify a plurality of ROIs in each frame, and may output a plurality of ROI image signals for processing by signal processing unit 20.

HDR image sensor(s) 14 may set integration time ($T_{INT}$) within which the signals from various pixels within HDR image sensors 14 are integrated. During the integration time, HDR image sensor(s) 14 may determine at certain time intervals whether any of the pixels are saturated. HDR image sensor(s) 14 may cause pixels within HDR image sensor(s) 14 to store digital bits associated with the time interval when a pixel becomes saturated, as described in more detail below. HDR image sensor(s) 14 may cause the saturated pixels to reset.

Display unit 24 may by a liquid crystal display (LCD) or other form of display that presents the merged video output for viewing by a user. Video storage 26 may store the merged video output into a storage medium, such as a Flash memory, PC card, hard-disk or other medium. Control unit 28 provides control signals to initiate and control the capture, display and storage of video data by video capture device 10. Control unit 28 may be responsive to input signals from one or more input devices, e.g., keys, touch-screens, switches, or other devices. By way of example, control unit 28 may be a general-purpose processor, digital signal processor (DSP), field programmable gate array (FPGA), or other suitable hardware logic capable of providing an environment for controlling video capture device 10.

As shown in FIG. 1, video processing chip 12 may comprise a single integrated chip, if desired. Alternatively, video processing chip 12 may comprise a "chip set" in which the components shown in FIG. 1 are implemented in a plurality of integrated circuits and any other necessary interface logic.

Figure 2:
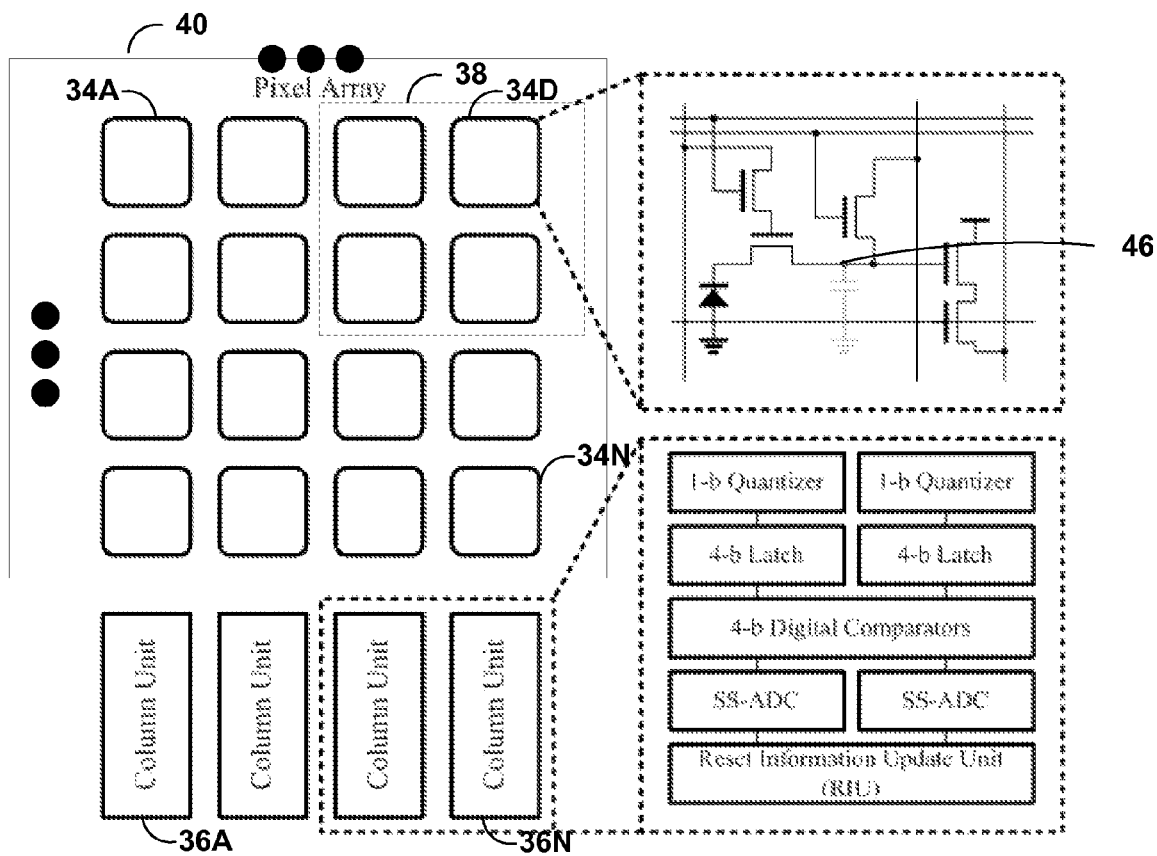
FIG. 2 is a circuit block diagram illustrating an example CMOS image sensor in further detail.

FIG. 2 is a circuit block diagram illustrating an example CMOS image sensor 14 in further detail. CMOS image sensor 14 includes a pixel array 40 having rows and columns of photodiode-based pixels 34A-34N (collectively referred to as pixels 34, herein) for capturing light and generating image data in the form of electrical charge. Each one of pixels 34 collects the light and outputs image signals while storing the digital information as described in detail below. Within pixel array 40, four neighboring pixels 38 may be used for storing digital information. A floating diffusion node 46 within each one of pixels 34 may store one bit of the digital information. Floating diffusion node 46 with each one of pixels 34 within neighboring pixels 38 may be used to generate 4-b digital information.

Column units 36A-36N (collectively referred to as column units 36 herein) perform column-level processing for the dynamic range extension and the motion detection while performing the analog-to-digital conversion. Each one of column units 36 includes 1-b quantizer, 4-b latch, 4-b digital comparator, single-slope ADC (SS-ADC), and the reset information update unit (RIU).

Figure 3:
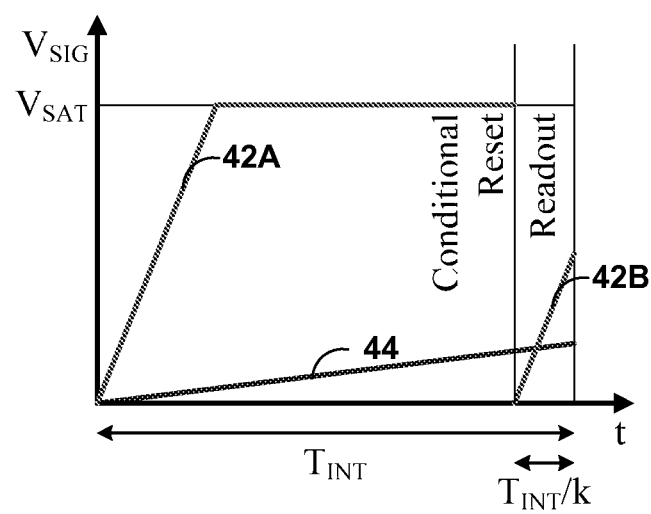
FIG. 3 is a graph illustrating the integration time control scheme.

FIG. 3 is a graph illustrating the integration time control scheme. Lines 42A, 42B, 44 refer to a photodiode output of a photodiode in a pixel. Lines 42A and 42B may be the output of a photodiode in a high illumination area, and line 44 may be the output of a photodiode in a low illumination area. In high illumination area, the photodiode may saturate in a relatively short period of integration time, while in a low illumination area the photodiode may saturate in a relatively large period of integration time. A conditional reset may be used to reset the photodiode based on the reset information described below. Consequently, the pixel is not saturated in high illumination and the high dynamic range (HDR) image signal may be received via post-processing. During integration, the stored reset information may be examined to determine whether reset should be performed or not. Reset information may be stored in digital bits. Reset information may require at least 4 bit (4-b) resolution. Normally, at least 10 time intervals at 4-b resolution may be required to achieve 120 dB of dynamic range. Table 1 below shows one example of bit levels to achieve 120 dB of dynamic range.

TABLE 1 reset information levels from lowest illumination to highest illumination.

| | | | |
|---|---|---|---|
| Lowest Illumination | 0000 | 1 | $V_{DARK}$ |
| | 0001 | $(1/2) \cdot T_{INT}$ | |
| | 0010 | $(1/2^2) \cdot T_{INT}$ | |
| | 0011 | $(1/2^3) \cdot T_{INT}$ | |
| | 0100 | $(1/2^4) \cdot T_{INT}$ | |
| | 0101 | $(1/2^5) \cdot T_{INT}$ | |
| | 0110 | $(1/2^6) \cdot T_{INT}$ | |
| | 0111 | $(1/2^7) \cdot T_{INT}$ | |
| | 1000 | $(1/2^8) \cdot T_{INT}$ | |
| Highest Illumination | 1001 | $(1/2^9) \cdot T_{INT}$ | |
| | 1010 | $(1/2^{10}) \cdot T_{INT}$ | $V_{SAT}$ |
| Not Used | 1011 | - | |
| | 1100 | - | |
| | 1101 | - | |
| | 1110 | - | |
| | 1111 | - | |

As seen in Table 1, the photodiode may be checked for saturation at various time intervals by HDR image sensor(s) 14. The actual integration time ($T_{INT}$) may be pre-programmed or set by a user. The 4-b illumination level may designate the time when a pixel became saturated. For example, in a high illumination situation, the pixel may saturate quickly at $(1/2^9)*T_{INT}$. Saturating at $(1/2^9)*T_{INT}$ translates into a 4-b illumination level of 1001. The 4-b illumination level may be stored as the reset information. Stated another way, the reset information may be the illumination level.

Since each pixel may need an optimal integration time, at least 4-b memory per pixel may be required. In this case, the frame memory may be unattainably large inside video processing chip 12 (FIG. 1). Additionally, the power consumption may be large as well.

In accordance with the invention, instead of allocating 4-b reset information to one pixel, the 4-b reset information may be allocated to four neighboring pixels and each pixel may store 1-b out of the 4-b reset information in a floating diffusion node, as described below. Since the spatial variance of the illumination is not abrupt, the 4-b allocation for four pixels is reasonable, especially for a small size pixel. Using a digital scheme of saving 4-b in a floating diffusion node in four neighboring pixels is more advantageous than using an analog voltage due to leaking in the floating diffusion node. Any potential leakage in the digital scheme may not problematic since the duration between the resets may be in the order of a few microseconds. Moreover, the stored signal may be refreshed during integration. 4-b reset information is used for ease and clarity, in other embodiments, more or fewer than 4-b reset information may be used. In such embodiments, more or fewer neighboring pixels may be used.

Figure 4:
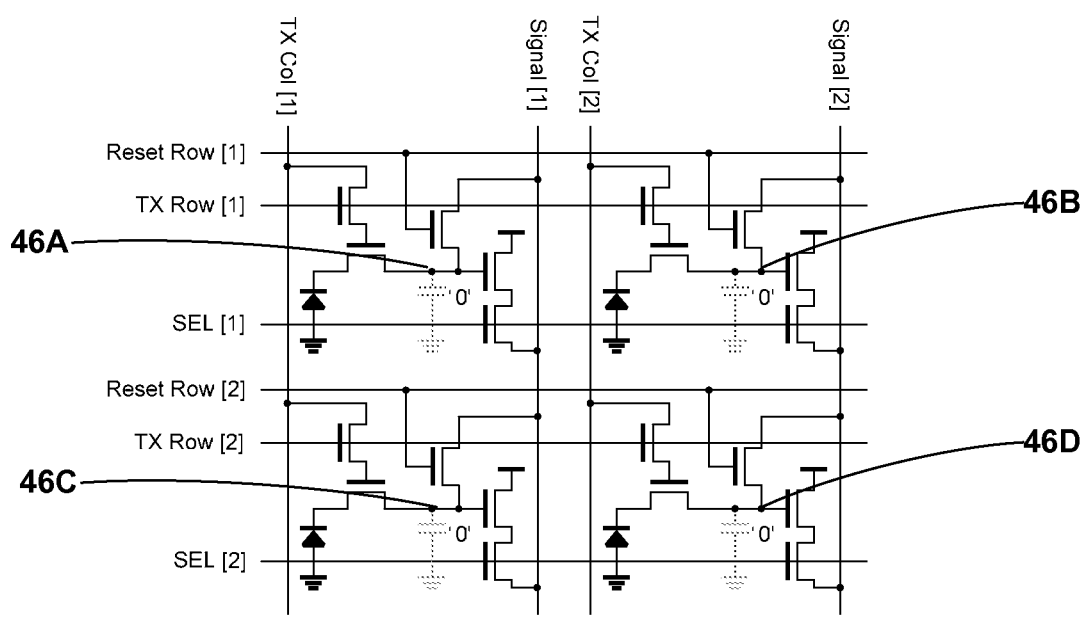
FIG. 4 is a circuit diagram illustrating four neighboring pixels.

FIG. 4 is a circuit diagram illustrating four neighboring pixels of pixel array 40 in HDR image sensor 14. Digital reset information may be read or written through existing signal lines without any additional read or write bus. Each pixel may only consist of five transistors. Each one of floating diffusion nodes 46A-46D (collectively referred to as floating diffusion nodes 46 herein) store 1-b of the 4-b reset information.

Figure 5:
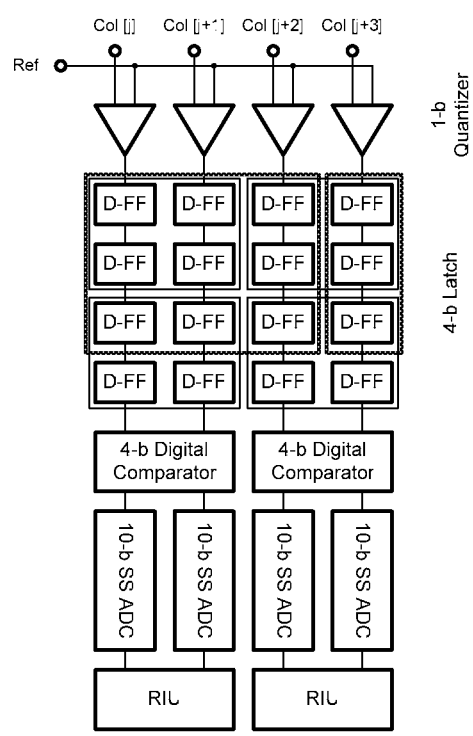
FIG. 5 is a block diagram illustrating the column architecture for generating a conditional reset and detecting the motion.

FIG. 5 is a block diagram illustrating the column architecture for generating a conditional reset. A 1-b quantizer may regenerate the stored digital signal in the four neighboring pixels. A 4-b latch may temporarily store the reset information for the processing. The 4-b latch may be a D flip-flop. A 4-b digital comparator may enable conditional reset by comparing with an external reference signal. An external reference signal may be a 4-b digital code that designates the appropriate reset timing in each of the time slots, i.e. time intervals of Table 1 based on the saturation level of the previous frame. For example, the digital reset information for each pixel group indicates a point in time when one or more of the pixels of the pixel group was reset during a previous integration period and indicates an illumination level for the pixel group during the previous integration period;

When the reference signal is equal to the stored reset information, reset may be performed. An ADC may convert an analog image signal into digital. One example of an ADC may be a 10-b column-parallel single-slope. The RIU (Reset Information Update Unit) may generate new reset information for the next frame by adjusting the reset information of the current frame signal. If the illumination increases abruptly in the current frame, then some pixels may become saturated because the 4-b reset information may be determined in the previous frame. In such a situation, the current frame may receive a saturated signal. However, a new reset information for adjusting to the increased illumination (based on the current frame signal) may be generated and an unsaturated signal may be received in the next frame. Since HDR image sensor 14 operates with high frame rate (>30 fps or >60 fps) and illumination does not change abruptly with such a high speed, the operation is reliable in capturing unsaturated images.

Figure 6:
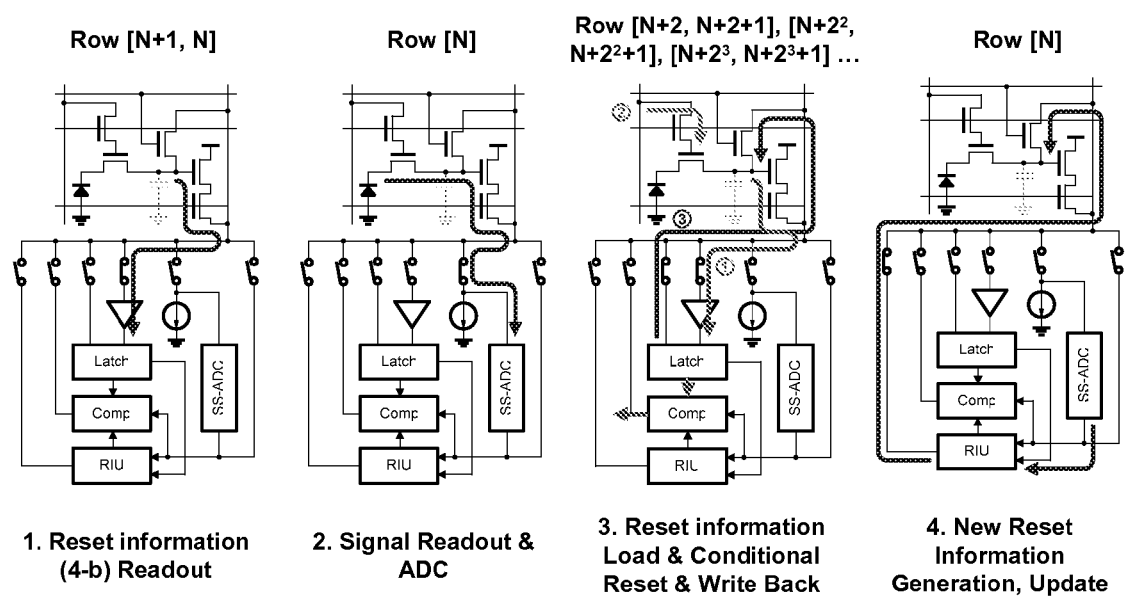
FIG. 6 is a series of phases detailing operation for HDR readout.

FIG. 6 is a series of phases detailing operation for HDR readout. In phase 1, the stored reset information (stored in two rows, N and N+1) may be loaded into the latch. The reset information may be 4-b. This may be required for generating new reset information in phase 4 and post-processing the image signal to compose the HDR image. In phase 2, the image signal (row N) may be read out and analog-to-digital conversion may be performed. In phase 3, row address may be changed for the conditional reset. The stored reset information may be loaded and compared with the reference in the comparator. If the reset information and the reference are equal, reset may be performed. After the conditional reset, the loaded reset information may be written back. In phase 4, RIU may generate new reset information based on the current frame signal (from the SS-ADC) and the newly generated reset information may be updated in the floating diffusion node.

The techniques described above may drastically reduce the memory necessary to save reset information for each pixel. Instead of saving reset information for every pixel, the techniques described above may use at least two, preferably four, pixels and store 1-b in each pixel to create the necessary 4-b needed to contain reset information. Additionally, as opposed to storing digital reset information in additional memory for each pixel separately, embodiments of the present invention may instead store 1-b within a floating diffusion contained within each pixel, resulting in drastic saving in memory size.

Figure 7:
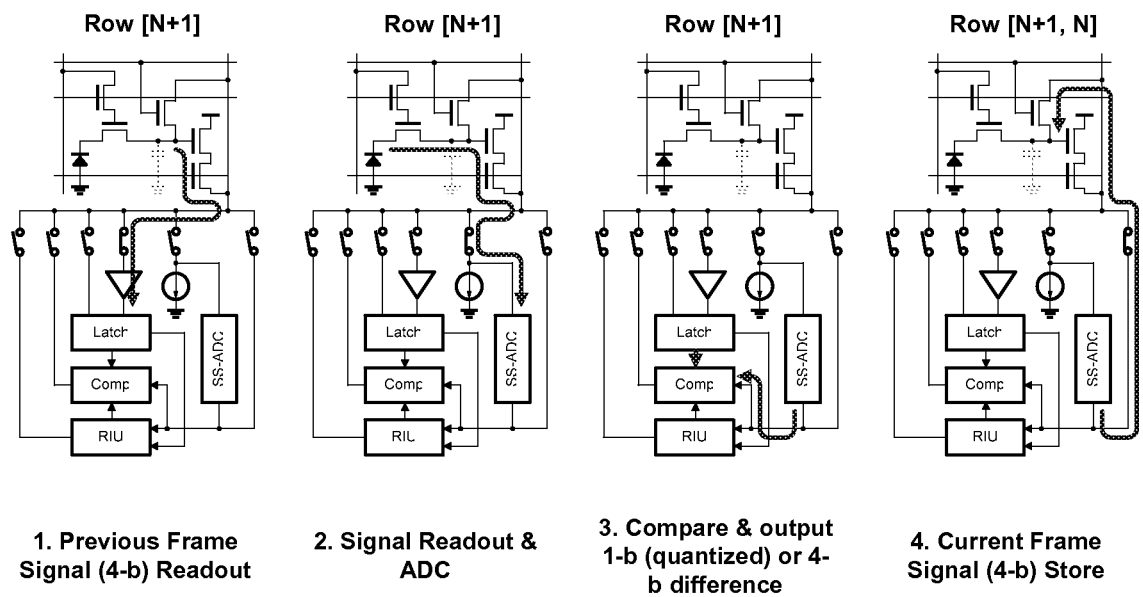
FIG. 7 is a series of phases detailing operation for motion detection for 4-b resolution.

FIG. 7 is a series of phases detailing operation for motion detection for 4-b resolution. Motion detection may also be performed using the in-pixel digital storage scheme described above. The signal difference between the current frame and the previous frame may indicate motion. By using the same four neighboring pixel circuit described in FIG. 4, and the column block diagram described in FIG. 5, motion detection may be performed without additional circuitry. In detecting motion, the quantized previous frame signal may be stored in the floating diffusion nodes 46. FIG. 7 shows the 4-b motion detection procedure. 4-b motion detection is shown for ease and clarity; the bit size may be different in different embodiments. In the previous frame, an image signal may be quantized into 4-b and may be stored in the floating diffusion nodes 46. In phase 1, the stored previous frame signal (4-b) may be loaded into the latch. In phase 2, the current frame signal may be read out and analog-to-digital conversion may be performed. One example of the analog-to-digital converters used in various embodiments of the invention may be an SS-ADC. In phase 3, the previous frame signal (from the latch) and the current frame signal (from SS-ADC) may be compared. The comparator may generate the motion image from 1-b to 4-b determined by user control. In phase 4, the current frame signal (4-b out of 10-b) may be written in the floating diffusion nodes 46. In other embodiments more than 4-b out of 10-b may be written in the floating diffusion nodes 46. In still other embodiments, the total bits may be more or fewer than 10-b.

Figure 8:
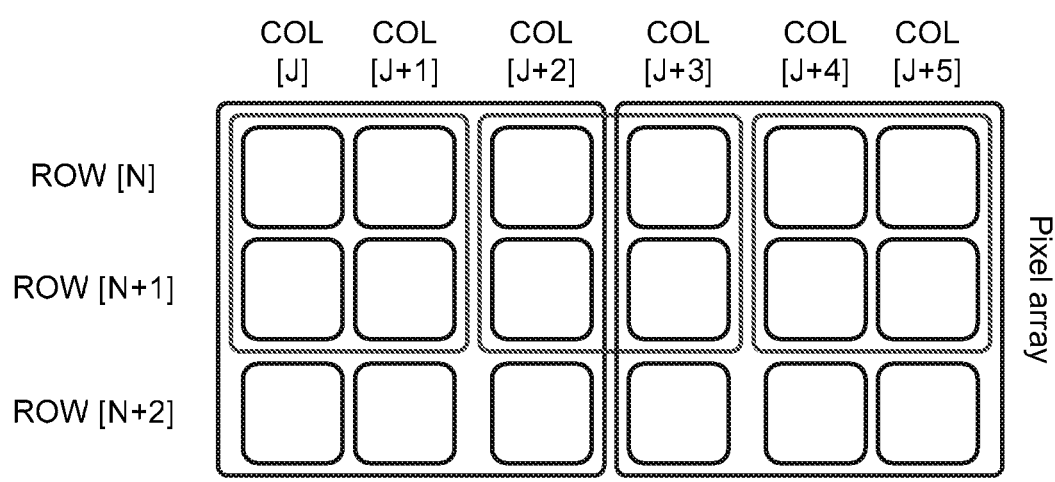
FIG. 8 is a block diagram illustrating motion detection for 9-b resolution.

FIG. 8 is a block diagram illustrating motion detection for 9-b resolution. The motion detection resolution is not limited to 4-b. As shown in FIG. 8, nine pixels can store 9-b information although the spatial resolution may be reduced. For 9-b resolution, operation may be nearly the same as the case of the 4-b motion detection described above.

Figure 9:
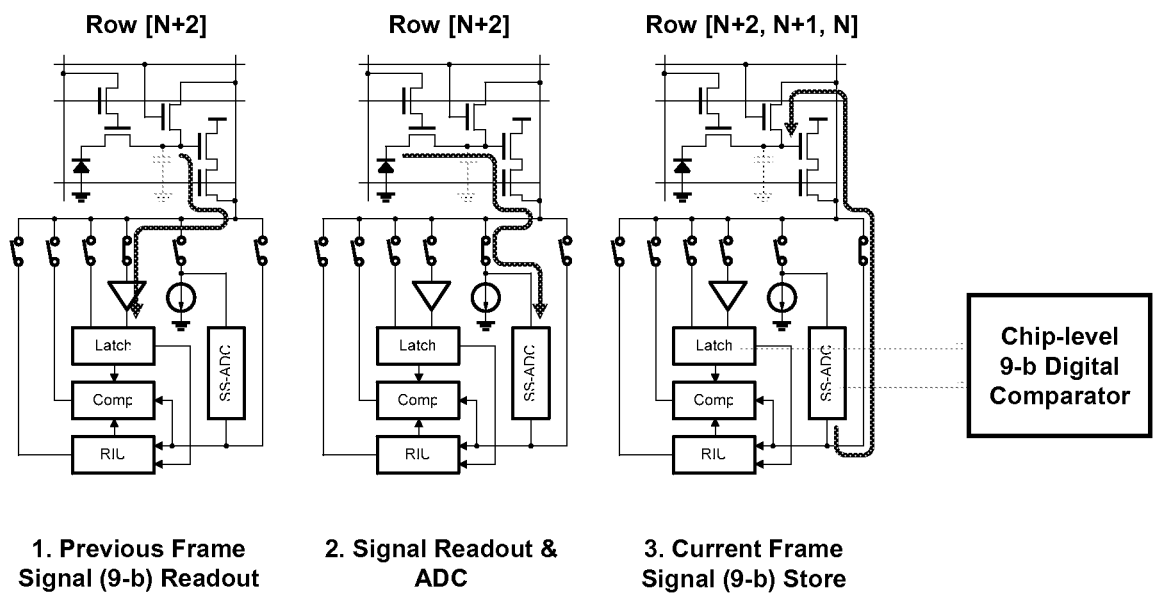
FIG. 9 is a series of phases detailing operation for motion detection for 9-b resolution.

FIG. 9 is a series of phases detailing operation for motion detection for 9-b resolution. The comparator may generate both 4-b or 9-b motion images according to the user's control. This motion detection may be performed while acquiring the normal images.

Conventional motion detection schemes in CMOS imagers do not work in high illumination because the pixels saturate. However, in accordance with the invention, combining the digital motion detection scheme using the digital reset information scheme described above may provide motion detection in extremely high illumination. Table 1 shows that each reset information digit represents not only the integration time but also the illumination level. By tracking the changes in the reset information, motion may be detected even in high illumination. In the previous frame, an image signal may be quantized into 4-b and may be stored in the floating diffusion nodes 46. In phase 1, the stored previous frame reset information (4-b) may be loaded into the latch. In phase 2, the current frame signal may be read out and analog-to-digital conversion may be performed. One example of the analog-to-digital converters used in various embodiments of the invention may be an SS-ADC. In phase 3, the conditional reset is performed. The comparator may generate the motion image from 1-b to 4-b determined by user control. In phase 4, the reset information may be compared. The stored reset information in the floating diffusion nodes 46 may be calculated from the previous frame signal. For tracking the change of the reset information, the stored reset information (based on the previous frame signal) should be compared with the newly generated reset information (based on the current frame signal) using a column comparator, similar to FIG. 5. The column comparator may generate the output of 1-b or 4-b motion image.

9-b motion detection may also be possible. Situations may arise where there is motion, but the illumination level is too low to ever saturate a photodiode in a pixel. In such a situation, 4-b associated with reset information may remain constant since none of the pixels saturated. Nine pixels may be used, where four pixels of the nine pixels may be associated with reset information, and five pixels of the nine pixels may be associated with illumination. In situations where there is motion but the illumination level is low, 4-b from the four pixels associated with reset information may remain constant, but floating diffusion nodes 46 for the five pixels may contain changes in illumination level, even though there may not be saturation. In the case of 9-b motion detection, both the 4-b reset information and 5-b image signal (out of 10-b image signal) may be combined and stored in floating diffusion nodes 46. As described above 4-b or 9-b motion detection, 4-b reset information, and 5-b image signal (out of 10-b image signal) are all exemplary. Various embodiments may use different amounts of bits for motion detection, reset information, and image signal.

Figure 10:
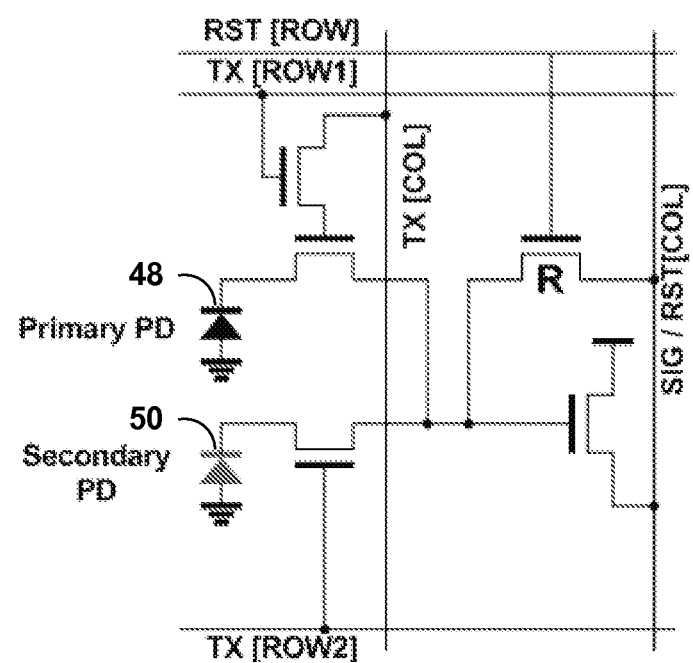
FIG. 10 is a circuit diagram illustrating dual photodiodes in a pixel.
Figure 11:
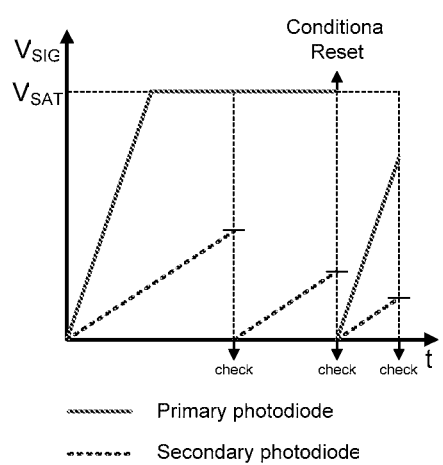
FIG. 11 is a graph illustrating the integration time control scheme for a dual photodiode configuration.

FIG. 10 is a circuit diagram illustrating dual photodiodes in a pixel. Using dual photodiodes in a pixel may be another method to enhance the dynamic range. Photodiode 48 may be the primary photodiode and may be used for acquiring image signals. Photodiode 50 may be the secondary photodiode and may acquire reset information. Photodiode 50 may have a smaller sensitivity than photodiode 48 for generating the reset information without being saturated in the high illumination. Consequently, the size of photodiode 50 may be much smaller than photodiode 48. Photodiode 50 may not cause severe fill-factor loss. For less sensitivity photodiode 50 may have a lower slope than photodiode 48 as shown in FIG. 11. With same high illumination, photodiode 50 may not be saturated although the photodiode 48 is saturated. Sensitivity is defined as the output voltage variation with 1 lux illumination during 1 sec integration time [V/1×sec]. Sensitivity may be a process dependent parameter. One purpose of photodiode 50 is generating the reset information based on the light condition. Photodiode 50 may be small, and therefore may have lower sensitivity because photodiode 50 may collect only small portion of light due to its small size.

FIG. 11 is a graph illustrating the integration time control scheme for a dual photodiode configuration. Operation may be based on the integration time control scheme similar to the one described in FIG. 3. The signal from photodiode 50 may be sampled at specific times and may be quantized into 4-b signals (digital reset information). Along the quantized reset information, photodiode 48 may be conditionally reset. The reset information may be generated based on the current frame illumination, instead of being based on the previous frame.

Figure 12A:
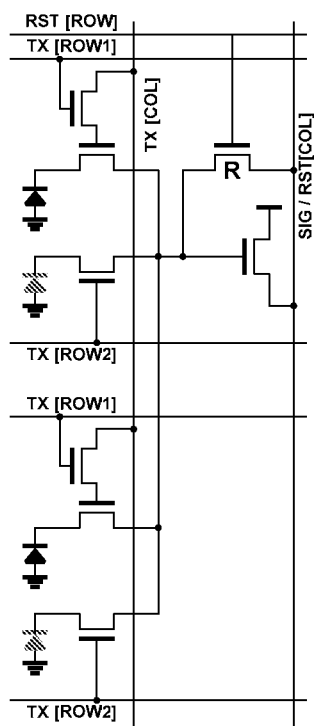
FIG. 12A is a circuit diagram illustrating a two-shared pixel structure.
Figure 12B:
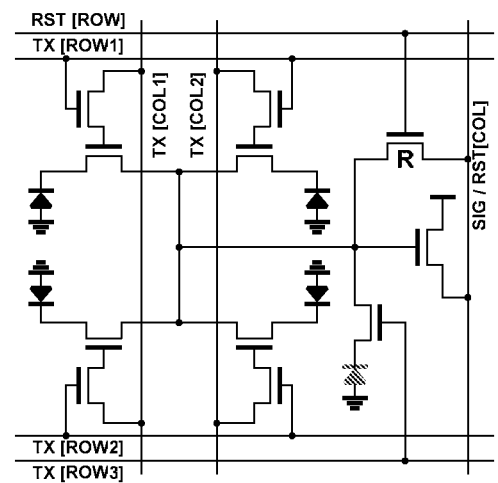
FIG. 12B is a circuit diagram illustrating a four-shared pixel structure.

FIGS. 12A and 12B are circuit diagrams illustrating two-shared pixel structure and a four-shared pixel structure, respectively. To enhance fill-factor, a shared pixel structure may be adopted. Each pixel may have its own 4-b reset information. FIG. 12A shows a two-shared pixel structure with one additional photodiode per pixel. Two pixels share the reset information. FIG. 12B shows a four-shared pixel structure with one additional photodiode shared by the four pixels. Four pixels share the reset information.

Various embodiments of the invention have been described. These and other embodiments are within the scope of the following claims.

The invention claimed is:

1. An image sensor comprising:
   an array of pixels to capture an image, the array of pixels arranged as a plurality of pixel groups, each of the pixel groups having a two or more pixels, each of the pixels having a floating diffusion node for outputting an image signal; and
   control logic to store digital reset information within the floating diffusion nodes of each pixel group,
   wherein the digital reset information comprises a multi-bit digital value for each of the pixel groups that indicates a point in time when one or more of the pixels of the pixel group was reset during a previous integration period and represents an illumination level for the pixel group during the previous integration period.

2. The image sensor of claim 1, wherein two or more of the pixels have a shared floating diffusion node.

3. The image sensor of claim 1, wherein each pixel comprises a photodiode.

4. The image sensor of claim 1, wherein each pixel comprises a first photodiode with a high sensitivity and a second photodiode with a sensitivity lower than the sensitivity of the first diode.

5. The image sensor of claim 1, further comprising a quantizer to generate the digital reset information from an image signal from each of the pixels of the pixel groups.

6. The image sensor of claim 1, further comprising a comparator to compare the digital reset information to an external reference signal indicative of a saturation level for the pixel group to trigger reset of the pixel group during the integration period.

7. The image sensor of claim 1, wherein each of the pixel groups comprises four pixels and the digital reset information for each of the pixel groups specifies a four bit value stored within the floating diffusion nodes of the four pixels.

8. The image sensor of claim 1, wherein each of the pixels comprises five transistors.

9. The image sensor of claim 1, wherein the sensor is a complementary metal-oxide-semiconductor (CMOS) sensor.

10. The image sensor of claim 1, wherein each of the pixel groups comprises nine pixels and the reset information is 9 bits.

11. The image sensor of claim 1, further comprising a comparator to generate a motion image based on the reset information.

12. An image sensor comprising:
    an array of pixels to capture an image, the array of pixels arranged as a plurality of pixel groups, each of the pixel groups having a two or more pixels, each of the pixels having a floating diffusion node for outputting an image signal, wherein each pixel comprises a first photodiode with a high sensitivity and a second photodiode with a sensitivity lower than the sensitivity of the first diode; and
    control logic to, for each of the pixel groups, trigger a conditional reset during an integration period for the pixel group to reset collection of illumination of the first photodiode of one or more of the pixels of the pixel group when illumination of the second photodiode for the one of the pixels of the pixel group reaches a specified threshold.

13. An image sensor comprising:
    an array of pixels to capture an image, the array of pixels arranged as a plurality of pixel groups, each of the pixel groups having a two or more pixels, each of the pixels having a floating diffusion node for outputting an image signal; and control logic to store digital reset information within the floating diffusion nodes of each pixel group,
wherein the digital reset information comprises a multi-bit digital value for each of the pixel groups, and
wherein each of the floating diffusion nodes for the pixels of each of the pixel groups stores one bit of the digital reset information for the pixel group.

14. A video capture device comprising:
an image sensor, the image sensor comprising:
an array of pixels to capture an image, the array of pixels arranged as a plurality of pixel groups, each of the pixel groups having a two or more pixels, each having a floating diffusion node for outputting an image signal; and
control logic to store digital reset information within the floating diffusion nodes of each pixel group, wherein the digital reset information for each pixel group indicates a point in time when one or more of the pixels of the pixel group was reset during a previous integration period and indicates an illumination level for the pixel group during the previous integration period;
a motion detection unit that identifies a region of interest by comparing the digital reset information computed for a current frame with the stored digital reset information and provides an address for the region of interest to the image sensor;
a signal processing unit that receives a motion signal based on the region of interest and an image signal based on the captured image from the image sensor and generates a merged output signal based on the motion signal and image signal; and
a display unit that receives the merged output signal and displays the merged output signal to a user.

15. The video capture device of claim 14, further comprising a video storage unit that receives the merged output signal and stores the merged output signal.

16. A method, comprising:
storing multi-bit digital reset information within a group of pixels within an image sensor, wherein the digital reset information for each pixel group indicates a point in time when one or more of the pixels of the pixel group was reset during an integration period, wherein each of the pixels stores one bit of the multi-bit digital reset information for the pixel group in a floating diffusion node of the pixel; and
outputting illumination values for the pixels computed from image signals read from the pixels and the multi-bit digital reset information.

17. The method of claim 16 further comprising:
loading into a latch the stored multi-bit digital reset information;
reading out an image signal;
performing analog-to-digital conversion on the image signal;
changing a row address for conditional reset;
comparing the stored multi-bit digital reset information with an external reference signal;
resetting if the stored multi-bit digital reset information and the external reference signal are equal;
generating a new multi-bit digital reset information based on the analog-to-digital conversion of the image signal; and
updating the floating diffusion node with the new multi-bit digital reset information.

18. The method of claim 16 further comprising:
capturing an image with the image sensor;
detecting motion within a region of interest of the image by comparing the digital reset information computed for a current frame with the stored digital reset information; and
outputting a motion image based on the detected region of interest.

19. A method of claim 18, wherein comparing the digital reset information computed for the current frame with the stored digital reset information comprises:
loading the stored digital reset information into a latch;
reading a current frame signal associated with the current frame;
converting the current frame signal from an analog signal to a digital signal; and
comparing the latched stored digital reset information with the digital signal.

20. The method of claim 16, wherein the digital reset information for each of the pixel groups indicates the point in time when one or more of the pixels of that pixel group was reset during a previous integration period and indicates an illumination level for the pixel group during the previous integration period.

* * * * *